United States Patent [19]

Murray

[11] Patent Number: 5,044,416

[45] Date of Patent: Sep. 3, 1991

[54] CASE AWNING ESPECIALLY FOR RECREATIONAL VEHICLE

[75] Inventor: Brent Murray, Trabuco Canyon, Calif.

[73] Assignee: The Dometic Corporation, Elkhart, Ind.

[21] Appl. No.: 492,646

[22] Filed: Mar. 13, 1990

[51] Int. Cl.⁵ .............................................. E04F 10/00
[52] U.S. Cl. ........................................ 160/22; 160/67
[58] Field of Search ..................... 160/22, 67, 66, 69, 160/70, 71, 72, 78, 79, 80, 46, 47; 135/89

[56] References Cited

U.S. PATENT DOCUMENTS

| | | | |
|---|---|---|---|
| 3,364,973 | 1/1968 | Railson | 160/71 X |
| 3,923,074 | 12/1975 | McKee | 135/89 X |
| 4,164,972 | 8/1979 | Bennett | 135/89 X |
| 4,171,013 | 10/1979 | Clark | 160/70 X |
| 4,188,964 | 2/1980 | Greer | 135/89 |
| 4,508,126 | 4/1985 | Everard | 160/67 X |
| 4,719,954 | 1/1988 | Curtis et al. | 160/67 |
| 4,733,683 | 3/1988 | Pozzi | 135/89 |

Primary Examiner—David M. Purol
Attorney, Agent, or Firm—Pearne, Gordon, McCoy & Granger

[57] ABSTRACT

A case awning assembly has a housing for receiving an awning rolled on a roller tube. An extensible rafter assembly is pivoted within the housing, and an extensible support arm is pivoted to the rafter assembly, with the roller tube being supported at the junction of the rafter and arm assemblies. Lock tabs are provided on the arm assembly for holding the rafter and arm assemblies and awning when the arm assembly is pivoted into the housing. The arm assembly is resiliently extensible and provided with a further locking arrangement to hold it to the housing, the further locking arrangement being releasable upon shortening of the arm assembly.

14 Claims, 5 Drawing Sheets

CASE AWNING ESPECIALLY FOR RECREATIONAL VEHICLE

FIELD OF THE INVENTION

This invention relates to awning structures, and is more in particular directed to an awning adapted to be stored in a case and mounted on the side of a recreational vehicle or wall. It will be apparent, however, that various features of the invention are adaptable to other awning arrangements.

BACKGROUND OF THE INVENTION

Various awnings for recreational vehicles have been disclosed, for example only, in U.S. Pat. Nos. 4,117,876; 4,164,972; 4,640,332 and 4,801,119.

SUMMARY OF THE INVENTION

The present invention is directed to the provision of an improved awning assembly of the above type.

Briefly stated, the invention is directed to a case awning having an awning, a housing, means for selectively storing the awning in the housing and extending the awning from the housing, a rafter arrangement for holding the awning at a position extended from the housing, and an arm arrangement for vertically positioning the awning when it is extended from the housing. In accordance with the invention, the rafter arrangement comprises a longitudinally extendible rafter pivoted to the housing, and the arm arrangement comprises a longitudinally extendible arm pivoted to the rafter, whereby the rafter and arm may be pivoted to fit within the housing. Locking means for releasably locking the rafter and arm in the housing comprise means responsive to pivoting of the arm into the housing for inhibiting movement of the arm and rafter from the housing.

The rafter arrangement may comprises a longitudinally extendible rafter, a first pivot arrangement for pivoting one end of the rafter within the housing, and the arm arrangement may comprise a longitudinally extendible arm, a second pivot arrangement for pivoting one end of the arm to the other end of the rafter, whereby the rafter and arm may be pivoted with respect to the housing and one another to fit within the housing. The locking means may comprise a recess arrangement in the housing, and a lock tab arrangement on the arm, the lock tab being positioned to engage the recess arrangement upon pivoting the arm to be enclosed in the housing, and to be free of the recess upon pivoting of the arm away from the housing. A cover is preferably pivoted to the housing.

The locking means may further comprises a cover lock positioned to hold the cover closed when the rafter and arm are fit within the housing.

The arm may comprise first and second arm portions slidably mounted with respect to one another, means for resiliently urging the arms to elongate the arm, and a projection on the other end of the arm, and the locking means may further comprise means on the housing for releasably engaging the projection. The projection preferably comprises a foot pivotally mounted to the arm, whereby the foot may be positioned to support the arm when the arm is not in the housing. A mounting bracket mounted on a wall supporting the awning assembly, for releasably holding the foot.

The rafter arrangement may comprise first and second rafters slidably mounted with respect to one another, and a locking arrangement for releasably holding the rafters at an extended position of the rafter arrangement.

The first pivot arrangement preferably comprises a pivot block pivoted within the housing about a first axis, the pivot block being pivoted to the one end of the rafter arrangement about an axis orthogonal to the first axis. The second pivot arrangement preferably comprises a first pivot block pivoted to the other end of the rafter, a second pivot block pivoted to the one end of the arm, the first and second pivot blocks being pivoted to one another.

The awning includes a roller tube and a shaft for rotatably supporting the roller tube, the shaft being rotatably mounted to one of the pivot blocks and fixedly mounted to the other of the pivot blocks. The awning further comprises torsion means and a fabric extending between the roller tube and housing, the torsion means being biased to urge the roller tube into the housing.

In a further embodiment of the invention, a case awning assembly comprises an elongated housing adapted to be mounted to a wall and having an open side away from the wall, and a cover for the housing pivoted to the upper side of the opening. A support extends from the lower side of the housing to define a gap between the lower edge of the cover and the housing when the cover is closed. An awning arrangement includes a roller tube, a fabric rolled on the roller tube, and a mounting shaft for the roller tube, one edge of the fabric being fixed to the inside of the cover. A support arrangement is coupled to the shaft, the support arrangement being pivotally mounted to the housing and including an arm arrangement mounted to be pivoted into the gap in a stored position of the awning arrangement. The arm arrangement has locking means for engaging the housing and cover to hold the cover against the housing when the arm is within the gap.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figures 1, 20, 21:
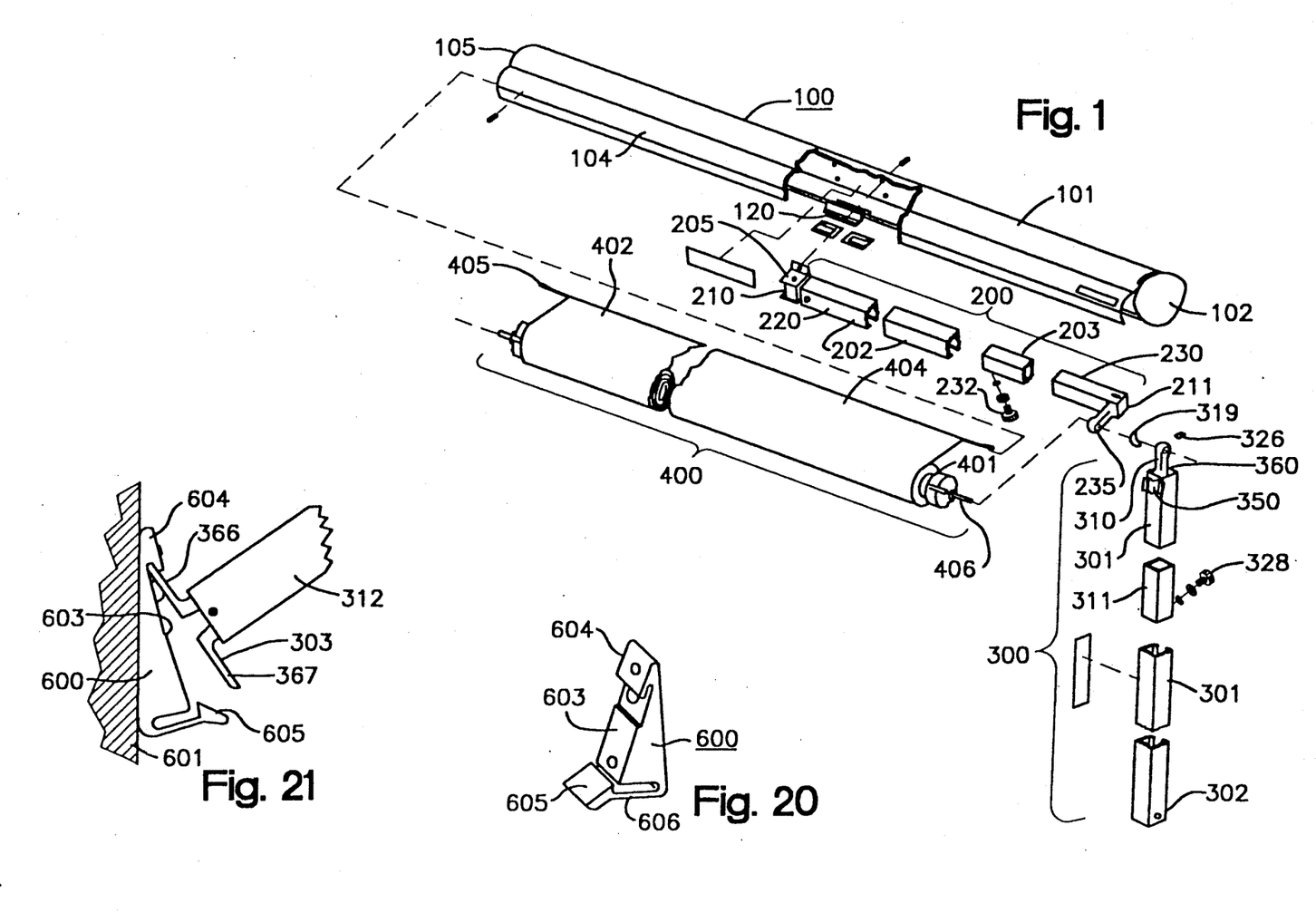
FIG. 1 is an exploded, partially sectional view of a case awning in accordance with the invention.
FIG. 20 is a perspective view of a bottom mounting bracket.
FIG. 21 is a side view illustrating the snapping of a foot or an arm assembly into the bottom mounting bracket of FIG. 20
Figures 2, 3:
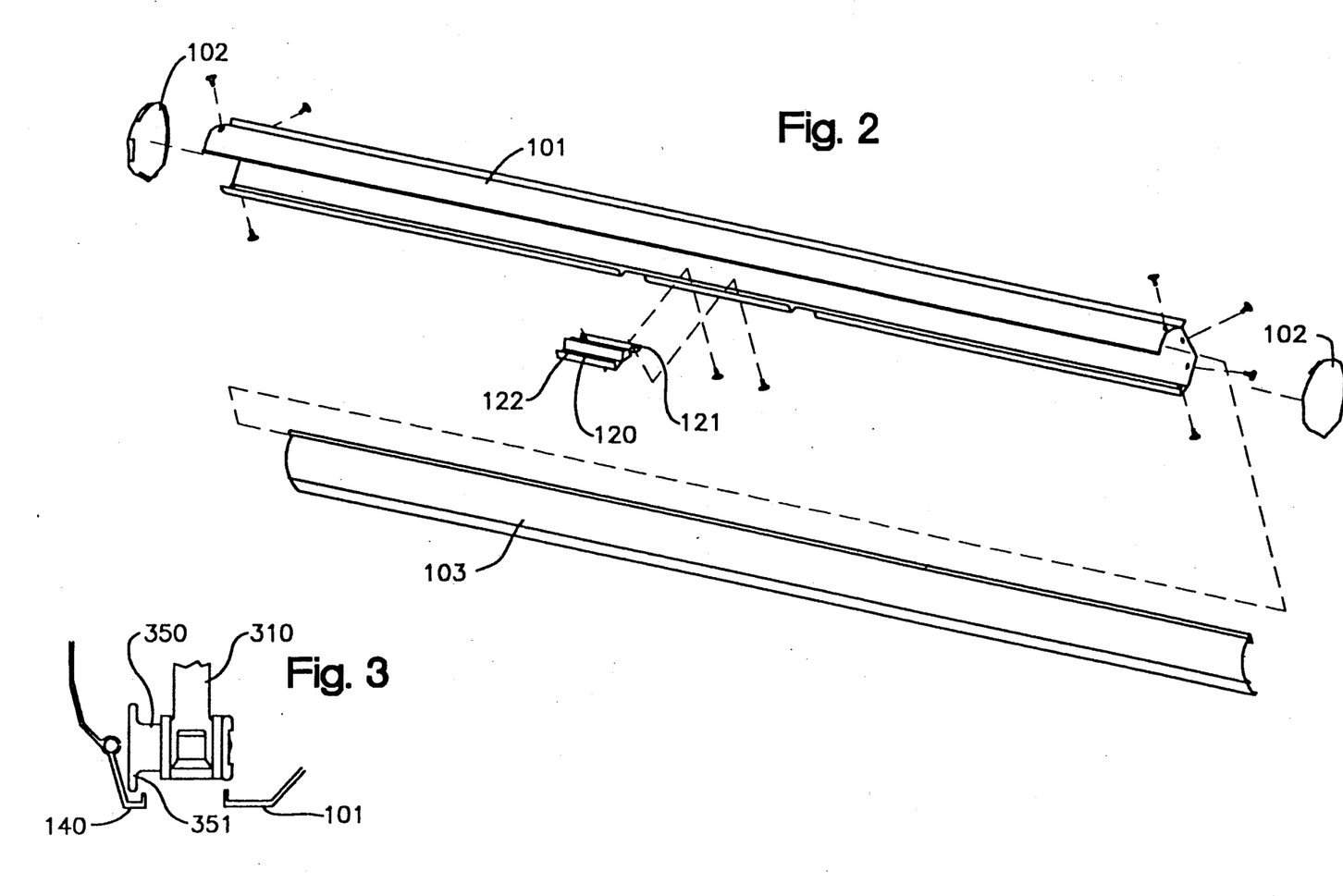
FIG. 2 is an exploded view of the case assembly of the case awning of FIG. 1.
FIG. 3 is a cross sectional view of the cover locking arrangement for the case awning of FIG. 1.

A case awning in accordance with a preferred embodiment of the invention includes a case assembly 100, as illustrated in FIGS. 1 and 2, adapted to be fitted to the side of a recreational vehicle or the like. The case assembly includes a main housing 101 adapted to extend horizontally along the side of the vehicle. The main housing 101 is channel shaped with its open side facing outwardly of the vehicle. End caps 102, are affixed to the ends of the main housing, for example by pop rivets, and a cover 104 is hinged to the upper side of the opening of the main housing.

Figure 10:
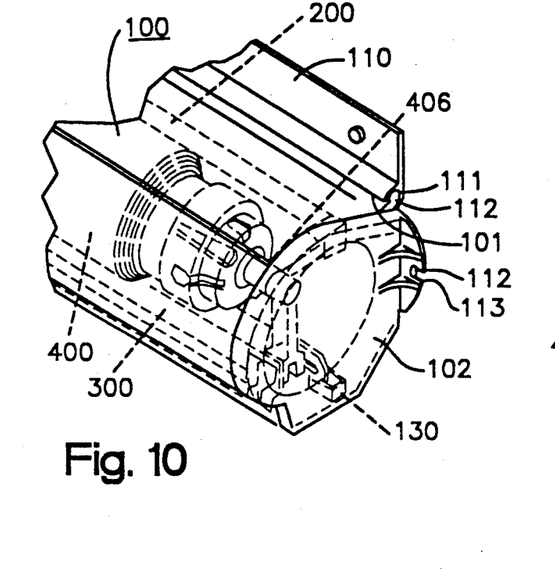
FIG. 10 is an enlarged phantom view of a portion of the case assembly with the rafter assembly, arm assembly and roller tube assembly stored therein.

As illustrated in FIG. 10, the main housing may be pivotally held to an awning rail 110, the awning rail being adapted to be affixed, for example by screws, to the side of a vehicle. For this purpose, the rail 110 may be provided with a groove 111 for receiving and pivotally holding a bead 112 on the bottom of the main housing, i.e. the side thereof toward the vehicle. A recess 130 is provided in the lower side of the main housing, at each end thereof, adjacent the open side of the main housing.

As illustrated in FIGS. 1 and 2, a support 120 is provided extending centrally of the main housing, from the lower edge of the open side thereof. This support has a flange 122 extending upwardly at its free end, against which the cover 104 abuts in the stored position of the awning. The support 120 also has a projection 121 that extends vertically adjacent the open side of the main housing.

One end 210 of a rafter assembly 200 is pivoted at the center of the case assembly, within the main housing 101 thereof. In its stored position, the rafter assembly 200 extends longitudinally within the main housing. When the awning is open, the other end 211 thereof is pivoted outwardly of the main housing. One end 301 of an arm assembly 300 is pivoted to the outer end of the rafter assembly. The other end 302 of the arm assembly is provided with a foot 303 adapted to either rest on the ground or be snapped into a bottom mounting bracket on the vehicle (not shown in FIG. 1), when the awning is open. In the stored position of the awning, the arm assembly is pivoted to lie adjacent the rafter assembly, within the main housing 101.

The rafter and arm assemblies shown in FIG. 1 extend from the center pivot within the main housing, toward the right hand end of the main housing. A similar rafter and arm assembly (not shown) extends from a center pivot within the main housing, toward the left hand end of the main housing.

A fabric roller tube assembly 400 includes a roller tube 401, around which an awning fabric 402 is rolled. One edge of the fabric 402 is affixed to the outer surface of the roller tube 401 by conventional means, for example, in a longitudinal groove in the outer surface of the roller tube. The opposite edge 404 is held in a longitudinal channel 105 (FIG. 3) on the inside of the cover 103. For this purpose, the edge 404 of the fabric may be enlarged by a cord 405 held in the hemmed edge 404, this enlarged edge being slid longitudinally into the channel 105 as depicted in FIG. 1. Rivets may be employed to hold the fabric centered. The roller tube assembly has a shaft 406 extending from each end thereof (only one of which is illustrated), the shaft 406 being held at the joint between the end 211 of the rafter assembly and the end 301 of the arm assembly.

As illustrated in FIGS. 1, 4, 5 and 6, the rafter assembly is comprised of an outer rafter assembly 202 and an inner rafter assembly 203. The terms "outer" and "inner", as used with respect to the rafters and arms, denotes the relative positions of the elements with respect to one another, e.g. the inner rafter slides within the outer rafter. It is of course apparent that the relative sizes of the rafters and arms may be interchanged.

Figures 4, 5, 6, 7, 7A, 8, 9:
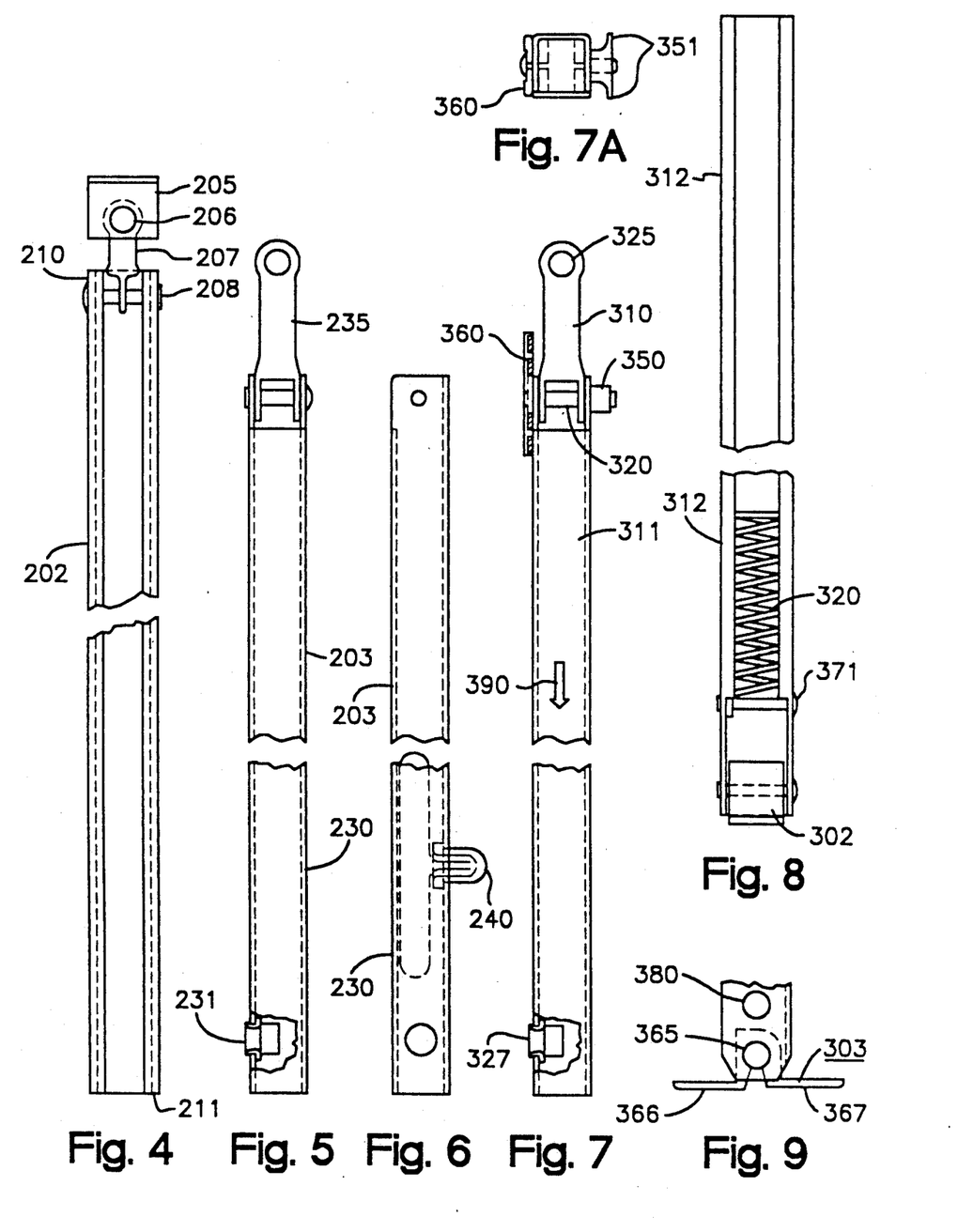
FIG. 4 is a bottom view of the outer rafter assembly for the case awning of FIG. 1.
FIG. 5 is a side view of the inner rafter assembly for the case awning of FIG. 1.
FIG. 6 is a top view of the inner rafter of FIG. 5.
FIG. 7 is a side view of the inner arm assembly for the case awning of FIG. 1.
FIG. 7A is a top view of the inner arm assembly of FIG. 7.
FIG. 8 is a rear view of the outer arm assembly for the case awning of FIG. 1.
FIG. 9 is a side view of a portion of the bottom of the outer arm assembly.

As shown in FIGS. 1 and 4, the outer rafter assembly includes a bracket 205 riveted or otherwise affixed adjacent the center of the back of the main housing. The bracket has a pair of vertically spaced arms with aligned holes for receiving a vertical pin 206. A pivot block 207 is pivoted on the pin 206. The other end of the pivot block 207 is pivoted on a horizontal pin 208 adjacent the end 210 of the outer rafter 220, so that the outer rafter 220 can be pivoted outwardly of the main housing and downwardly. The outer rafter 220 is channel shaped with its open side facing downwardly.

As illustrated in FIG. 1, 5 and 6, the inner rafter 230 is box shaped to slide in the outer rafter. A threaded insert 231 in one end of the inner rafter faces downwardly, to receive a threaded adjustment knob 232 that extends upwardly though the open channel side of the outer rafter to permit locking of the relative position of the inner rafter in the outer rafter. A pivot block 235 is pivoted to the other end of the inner rafter, about a vertical axis. The pivot block has a horizontal hole in its other end to receive the shaft 406 of the roller tube assembly 400. The inner rafter 230 also has a spring button 240 (FIG. 6) extending from the side thereof toward the main housing, to engage a hole (not shown) in the outer rafter. This spring button is biased outwardly of the inner rafter, to lock the inner rafter to the outer rafter at a fully extended position of the awning. To simplify the adjustment of the awning by ensuring that the roller tube assembly does not automatically roll back into the main housing, the adjustment knob 232 is not tightened.

As illustrated in FIGS. 1, 7, 8 and 9, the arm assembly is comprised of a pivot block 310, an inner arm 311, an outer arm 312 and a foot 302.

The inner arm 311, as seen in FIGS. 1, 7 and 7A, is box shaped, and the pivot block 310 is pivoted to one of the inner arms about a horizontal pivot pin 320. The other end of the pivot block 310 has a hole 325 aligned with the hole of the pivot block 235 of the inner rafter, the shaft 406 of the roller also extending through this hole. The shaft 406 is fixedly held in the hole 325 by a groove pin 326, so that the shaft does not rotate with respect to the arm assembly. As seen in FIG. 1, a washer 319 separates the pivot blocks of the inner rafter and inner arm.

As shown in FIGS. 1, 7 and 7A, a T-shaped box cover lock 350 is affixed to the end of the inner arm to which the pivot block 310 is pivoted. The box cover lock 350 has transversely extending cross arms 351 spaced from the inner arm. A lock tab 360 is affixed to the side of the inner arm opposite the box cover lock.

A threaded insert 327 is affixed in the other end of the inner arm, for receiving the threaded adjustment knob 328 (FIG. 1). The shaft of the adjustment knob is positioned to be slidably received in the open side of the channel shaped outer arm 312, to enable the inner arm to be clamped to the outer arm at any desired position.

Referring to FIGS. 1, 8 and 9, the outer arm is channel shaped, with the open side toward the rear, and slidingly receives the inner arm. The foot 303 is pivoted to the lower end of the outer arm, about a pivot pin 365. The foot has oppositely extending wings 366,367 adapted to rest on the ground in the position of the awning illustrated in FIG. 1. As will be seen in further paragraphs, the foot also serves additional functions.

A compression spring 370 is fitted within the outer arm 312, with one end of the spring abutting a pin 371 spaced a short distance from the pin 365. As will be seen, the compression spring is adapted to engage the lower end of the inner arm when the awning is stored, in order to enable the awning assembly to be releasably held in the main housing. A release hole 380 is provided in a side wall of the outer arm, as shown in FIG. 9.

Referring now to FIGS. 1 and 11-14, the fabric roller tube assembly 400 includes a roller tube 401 upon which the awning fabric 402 is rolled. The roller tube has longitudinal groove to receive a spline (not illustrated) for holding one edge of the fabric in conventional manner. The opposite edge 404 of the fabric is held in a similar manner to the inside of the cover. A torsion arrangement is mounted on each end of the roller tube, the torsion arrangements including an end cap 410 rotatably mounted on each end of the roller tube. The torsion arrangements further include a shaft 406 extending through and non-rotatable with respect to the respective end cap, and a stabilizer plate 411 rotatably mounted on to the shaft within the roller tube. The stabilizer plates 411 have one or more grooves 412 for receiving longitudinal ridges (not illustrated) on the inside of the roller, so that the stabilizer plates do not rotate with respect to the roller tube. A torsion spring 420 surrounds each shaft 406, with one end of the torsion spring being affixed to the stabilizer plate and the other end thereof being affixed to the shaft, for example, by a screw 421.

Figures 11, 12:
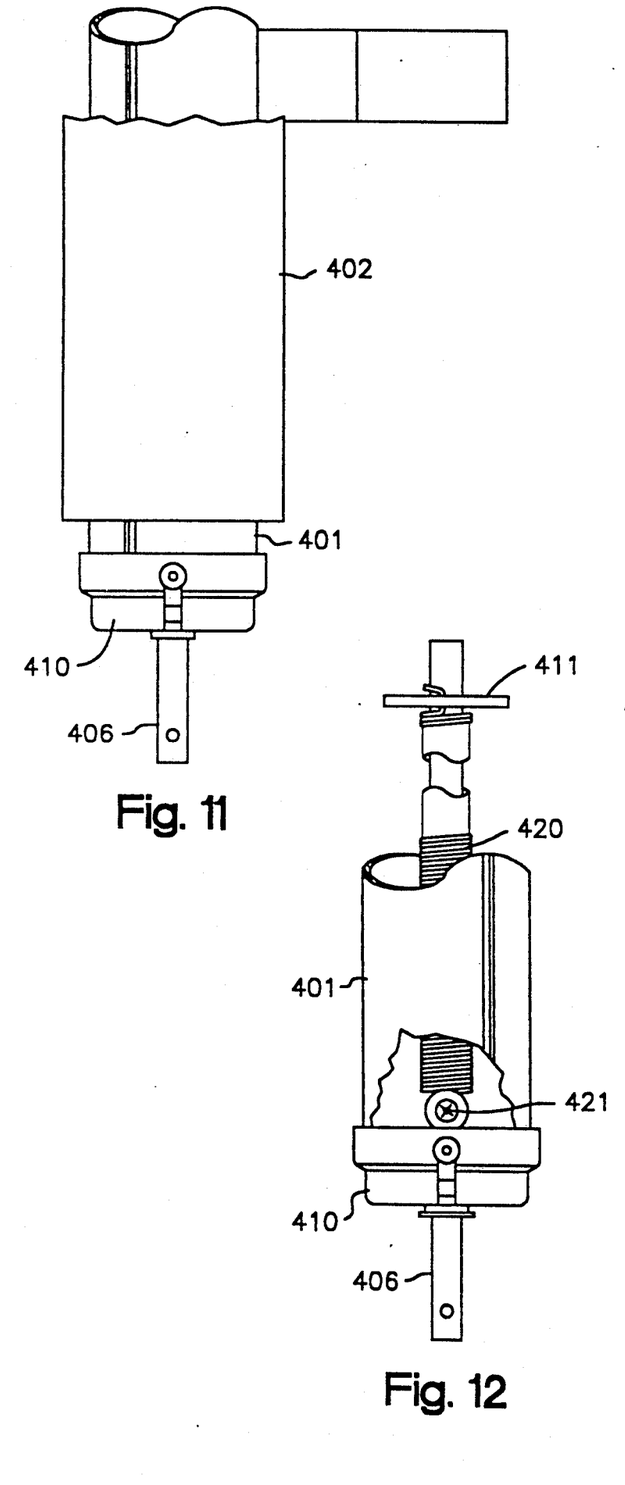
FIG. 11 is a partial side view of the roller tube assembly for the roller tube assembly.
FIG. 12 is a partial cut-away view of the roller tube assembly of FIG. 11.
Figure 13:
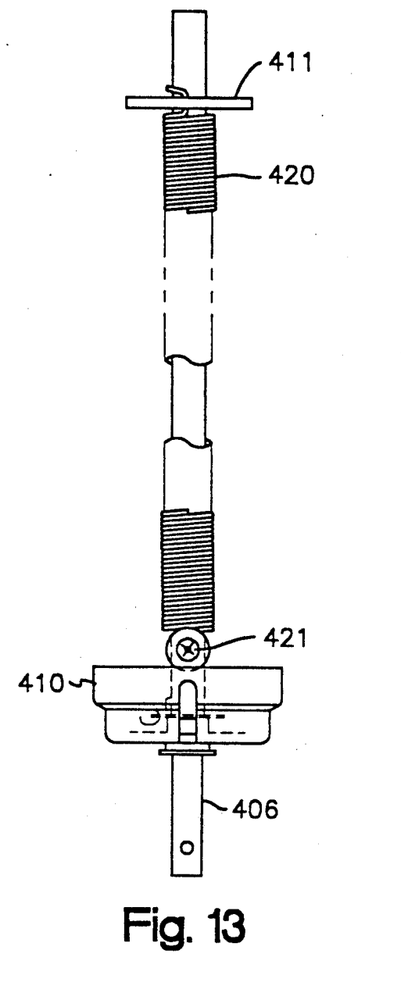
FIG. 13 is a side view of the torsion assembly for the roller tube assembly.
Figure 14:
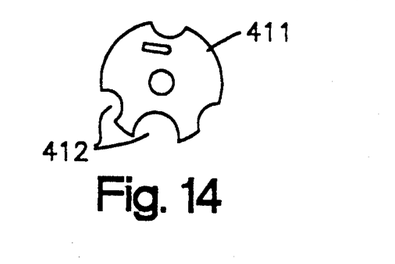
FIG. 14 is a side view of the stabilizer plater for torsion assembly of FIG. 13.
Figure 15:
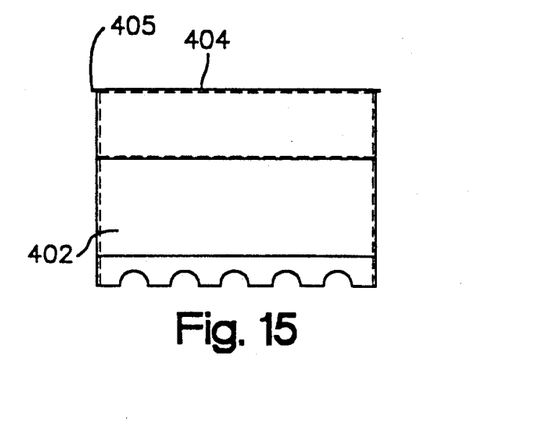
FIG. 15 is a plan view of the fabric for the awning.
Figure 16:
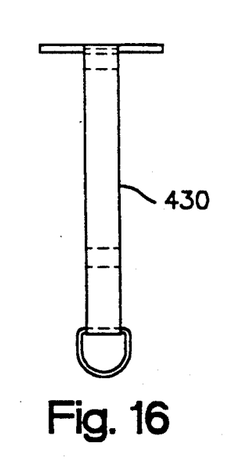
FIG. 16 is a plan view of a pull strap for the awning.

Since the shafts 406 are pinned to the pivot blocks of the inner arms, they do not rotate with the roller as the roller is manually moved toward and away from the vehicle. The torsion springs apply forces to the roller tube that tend to roll the roller tube assembly into the main housing. A pull strap 430 is affixed to the roller tube, as illustrated in FIGS. 11 and 16, to enable an operator to manipulate the fabric roller tube assembly.

When the roller tube assembly 400 is stored in the case assembly 100, as illustrated in FIG. 10, the rafter assembly 200 is pivoted to extend along the bottom of the main housing (i.e. along the side of the main housing toward the vehicle). The pivot block 235 thereby extends towards the open side of the main housing. The arm assembly 300 is pivoted to extend adjacent the bottom of the open side of the main housing. The fabric roller tube assembly 400 is thus held, by its shafts 406, within the main housing. In this position of the arm assembly, the lock tab 360 extends into the recess 130 in the main housing, to prevent movement of the rafter, arm and roller tube assemblies out of the main housing. Further, at this position of the arm assembly, the box cover lock 350 is pivoted to engage a lip 140 on the bottom edge of the cover 104, as seen more clearly in FIG. 3, to hold the cover 104 closed.

Further, in the stored position of the awning, the inner arm 311 is slid into the outer arm 312 a sufficient distance to compress the spring 370. In this position of the arm assembly, the foot 303 has been pivoted with the wings 366, 367 extending parallel to the outer arm. The force of the spring on the inner arm urges a wing of the foot 303 behind the projection 121, thereby firmly locking the entire awning assembly within the main housing, with the cover also being locked in a closed position.

EXTENDING THE AWNING

Figure 19:
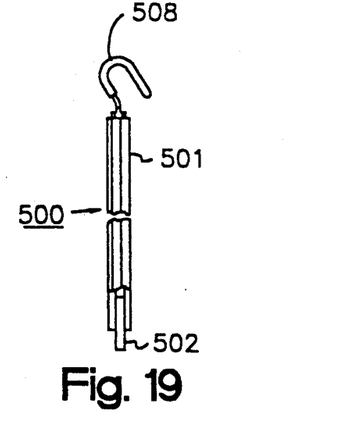
FIG. 19 illustrates a wand that may be employed in releasing the awning.

A wand 500, for example as illustrated in FIG. 19, may advantageously be employed to release the awning from the main housing. This wand has a staff 501 adapted to be held by the operator, and a pin 502 at one end adapted to be fit in the hole 380 of the outer arm.

Figure 17:
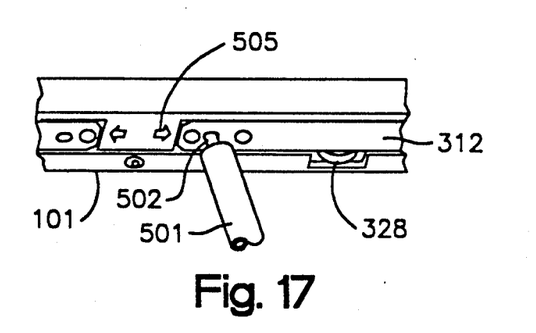
FIG. 17 is a perspective view illustrating a first step in releasing the awning.
Figure 18:
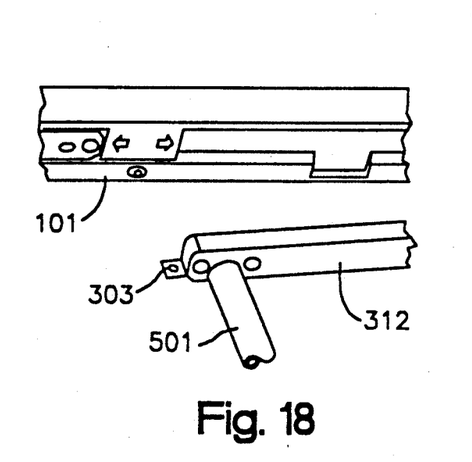
FIG. 18 is a perspective view illustrating a second step in releasing the awning.

FIG. 17 illustrates a portion of the underside of the assembly of the invention in the stored position. As illustrated, the side of the outer arm 312 is facing downward with the hole 380 exposed. In order to release the assembly, the pin 502 of the wand is inserted in the hole 380, and urged in the direction of the arrow 505. The movement urges the outer arm to further compress the compression spring 370 in the respective outer arm, and thereby to laterally withdraw the foot 303 of the outer arm from its locking position behind the projection 121. This end of the outer arm is now free to drop, as illustrated in FIG. 18. The consequent pivoting of the arm assembly releases the box cover lock 350 from the lip 140 of the cover 104, and releases the lock tab 360 from the recess 130 (FIG. 10), so that, for example, the arm assembly may be vertically aligned and adjusted lengthwise so that the foot 303 rests on the ground.

A similar method is employed for releasing the other rafter and arm assembly.

The pull strap 430 may now be pulled by the operator to withdraw the roller tube assembly from the main housing. To simplify this task, the other end of the wand 500 (FIG. 19) may be provided with a hook 508, that the operator may employ to engage the loop in the strap.

The adjusting knobs 232 are tightened upon pulling the awning out the desired distance. The height of the arm assembly may be adjusted if desired. When the awning is fully extended, the spring button 240 engages a hole (not illustrated) in the outer rafter, to prevent the awning assembly from inadvertently withdrawing into the main housing.

The awning may be changed from the patio position, with the feet 303 on the ground, to a pivot position with the feet held to the side of the vehicle. For this purpose, as illustrated in FIGS. 20 and 21, a bottom mounting bracket 600 is affixed, for example by screws, to the side 601 of the vehicle. The bracket 600, which may be molded of plastic, includes a flat rear surface adapted to be fit against the vehicle. The bracket has a central inclined surface 603 extending downward from a narrow portion adjacent a hook 604 at the top of the bracket. A lower hook 605 is supported, for example, by a flexible section 606, from the base of the bracket. The top of the lower hook 605 is inclined, as illustrated. As shown in FIG. 21, the foot 303 may be snapped to the bracket by releasing the adjustment knob 328 and raising the arm assembly from the ground until the wing 366 of the foot is caught behind the hook 604 of the bracket. The arm 312 may then be urged against the bracket, so that the wing 367, acting against the inclined surface of the lower hook, causes the wing 367 to be snapped behind the lower hook.

STORING THE AWNING

In storing the awning, it is preferable to first place the assembly in the pivot position, with the feet 303 snapped into the brackets 600. The arm assemblies are then adjusted to have a predetermined length. For this purpose, for example, an arrow 390 may be imprinted on the inner arm 311, as illustrated in FIG. 7, and the arm assembly adjusted until the tip of the arrow is aligned with the end of the outer arm 312. The pull strap is now firmly grasped, and the adjusting knobs 232 of the rafter assemblies loosened, to allow the awning to roll up assemblies loosened, to allow the awning to roll up into the main housing. If the awning has been fully extended, it is necessary to first release the spring buttons 240.

The adjustment knobs 328 of the arm assemblies are now loosened, and the feet 303 removed from the respective brackets. The pin 502 of the wand is now inserted in a release hole 380, and the respective arm swung up until the foot 303 thereof is adjacent the support 120. The foot must be aligned with the arm. The wand is now urged to compress the spring 370 of the arm assembly so that the foot clears the support, the wand then being pushed upward and released so that the foot wing catches behind the projection 121.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. In a case awning assembly having a having an awning, a housing, means for selectively storing said awning in said housing and extending said awning from said housing, a rafter arrangement for holding said awning at a position extended from said housing, and an arm arrangement for vertically positioning said awning when it is extended from said housing, the improvement wherein
said rafter arrangement comprises a longitudinally extendible rafter pivoted to said housing, said arm arrangement comprises a longitudinally extendible arm pivoted to said rafter, whereby said rafter and arm may be pivoted to fit within said housing, while remaining pivotally connected together and means for releasably locking said rafter and arm in said housing,
said locking means comprising means responsive to pivoting of said arm into said housing for inhibiting movement of said arm and rafter from said housing.

2. In a case awning assembly having a having an awning, a housing, means for selectively storing said awning in said housing and extending said awning from said housing, a rafter arrangement for holding said awning at a position extended from said housing, and an arm arrangement for vertically positioning said awning when it is extended from said housing, the improvement wherein
said rafter arrangement comprises a longitudinally extendible rafter, a first pivot arrangement for pivoting one end of said rafter within said housing, said arm arrangement comprises a longitudinally extendible arm, a second pivot arrangement for pivoting one end of said arm to the other end of said rafter, whereby said rafter and arm may be pivoted with respect to said housing and one another to fit within said housing while remaining pivotally connected together, and means for releasably locking said rafter and arm in said housing,
said locking means comprising a recess arrangement in said housing, and a lock tab arrangement on said arm, said lock tab being positioned to engage said recess arrangement upon pivoting said arm to be enclosed in said housing, and to be free of said recess upon pivoting of said arm away from said housing.

3. The case awning assembly of claim 2 further comprising a cover pivoted to said housing, and said locking means further comprises a cover lock positioned to hold said cover closed when said rafter and arm are fit within said housing.

4. The case awning assembly of claim 2 wherein said arm comprises first and second arm portions slidably mounted with respect too one another, spring means for resiliently urging said arms to elongate said arm, and a projection on the other end of said arm, said locking means further comprising mating means on said housing for releasably engaging said projection, said spring means operating to maintain said projection and mating means in locking engagement.

5. The case awning assembly of claim 6 where said projection comprises a foot pivotally mounted to said arm, whereby said foot may be positioned to support said arm when said arm is not in said housing.

6. The case awning assembly of claim 5 wherein said assembly is mounted on a wall, and further comprising a mounting bracket on said wall below said housing, said mounting bracket comprising a spring clip for releasably holding said foot.

7. The case awning assembly of claim 2 wherein said rafter arrangement comprises first and second rafters slidably mounted with respect to one another, and a locking arrangement for releasably holding said rafters at an extended position of said rafter arrangement.

8. The case awning assembly of claim 2 wherein said first pivot arrangement comprises a pivot block pivoted within said housing about a first axis, said pivot block being pivoted to said one end of said rafter arrangement about an axis orthogonal to said first axis.

9. The case awning assembly of claim 2 wherein said second pivot arrangement comprises a first pivot block pivoted to said other end of said rafter, a second pivot block pivoted to said one end of said arm, said first and second pivot blocks being pivoted to one another.

10. The case awning assembly of claim 9 wherein said awning includes a roller tube and a shaft for rotatably supporting said roller tube, said shaft being rotatably mounted to one of said pivot blocks and fixedly mounted to the other of said pivot blocks.

11. The case awning assembly of claim 10 wherein said awning further comprises torsion means and a fabric extending between said roller tube and housing, said torsion means being biased to urge said roller tube into said housing.

12. A case awning assembly comprising an elongated housing adapted to be mounted to a wall and having an open side away from said wall, a cover for said housing pivoted to the upper side of said opening, a support extending from the lower side of said housing to define a gap between the lower edge of said cover and said housing when said cover is closed, an awning arrangement including a roller tube, a fabric rolled on said roller tube, and a mounting shaft for said roller tube, one edge of said fabric being fixed to the inside of said cover, and a support arrangement coupled to said shaft, said support arrangement being pivotally mounted to said housing and including an arm arrangement mounted to be pivoted into said gap in a stored position of said awning arrangement, said arm arrangement having locking means for engaging said housing and cover to hold said cover against said housing when said arm is within said gap.

13. The case awning assembly of claim 12 wherein said arm is resiliently extensible, and comprises further locking means engaging said housing when said arm arrangement is within said gap, said further locking means being releasable by applying a force thereto to shorten said arm assembly.

14. The case awning assembly of claim 13 wherein said further locking means comprises a foot pivoted to said arm arrangement, said foot being adapted to vertically support said assembly when said arm arrangement is released from said gap.

* * * * *

UNITED STATES PATENT AND TRADEMARK OFFICE
CERTIFICATE OF CORRECTION

PATENT NO. : 5,044,416
DATED      : September 3, 1991
INVENTOR(S) : Brent Murray It is certified that error appears in the above-indentified patent and that said Letters Patent is hereby corrected as shown below:

Column 1, line 22, before "having an" insert --assembly--.
Column 1, line 52, "comprises" should be --comprise--.
Column 1, line 64, before "mounted" insert --is--.
Column 3, line 3, after "for" insert --the--.
Column 3, line 17, after "20" insert --.--.
Column 3, line 27, after "102" delete --,--.
Column 3, line 29, "104" should be --103--.

UNITED STATES PATENT AND TRADEMARK OFFICE
CERTIFICATE OF CORRECTION

PATENT NO. : 5,044,416

DATED : September 3, 1991

INVENTOR(S) : Brent Murray

It is certified that error appears in the above-identified patent and that said Letters Patent is hereby corrected as shown below:

Column 7, line 24, delete "assemblies loosened, to allow the awning to roll up".

Column 7, line 56, after "housing" delete --,--.

Column 7, line 57, after "together" insert --,--.

Column 8, line 28, "too" should be --to--.

Column 8, line 35, "claim 6" should be --claim 4--.

Signed and Sealed this

Fifth Day of October, 1993

Attest:

BRUCE LEHMAN

Attesting Officer

Commissioner of Patents and Trademarks